Dec. 4, 1956  R. R. GRAVES  2,772,979
METHOD FOR PROCESSING MILK PRODUCTS
Filed April 12, 1952  6 Sheets-Sheet 2

Fig. 2.

INVENTOR.
Roy R. Graves
BY Wallenstein & Spangenberg
Attys

Fig. 3.

Dec. 4, 1956  R. R. GRAVES  2,772,979
METHOD FOR PROCESSING MILK PRODUCTS
Filed April 12, 1952  6 Sheets-Sheet 5

Fig. 7.

INVENTOR.
Roy R. Graves
BY Wallenstein & Spangenberg
attys.

Dec. 4, 1956 R. R. GRAVES 2,772,979
METHOD FOR PROCESSING MILK PRODUCTS
Filed April 12, 1952 6 Sheets-Sheet 6

INVENTOR.
Roy R. Graves
BY
Wallenstein & Spangenberg
attys.

United States Patent Office 2,772,979
Patented Dec. 4, 1956

2,772,979

METHOD FOR PROCESSING MILK PRODUCTS

Roy R. Graves, Valparaiso, Ind., assignor to The Graves-Stambaugh Corporation, a corporation of Delaware Application April 12, 1952, Serial No. 281,961

5 Claims. (Cl. 99—184)

This invention relates to a method for processing milk products. This application is a continuation-in-part of my copending application Ser. No. 95,225, filed May 16, 1949 (now Patent No. 2,616,809), of my copending application Ser. No. 781,602, filed October 23, 1947 (now Patent No. 2,610,608), and of my copending application Ser. No. 257,211, filed November 20, 1951, said application Ser. No. 257,211 also being a continuation-in-part of said applications Ser. Nos. 95,225 and 781,602, and said application Ser. No. 95,225 also being a continuation-in-part of said application Ser. No. 781,602.

Briefly, the process disclosed in the aforementioned applications and also disclosed in this application comprises, at the farm, withdrawing milk from cows without contact with air by means of milking machines, individually collecting the withdrawn raw milk from each cow in transparent weigh jars without contact with air, weighing and inspecting the milk in the weigh jars, and collecting the milk from the weigh jars in a portable vacuum receiving tank without substantial contact with air and at substantially body temperature. This withdrawing and collecting of the milk at the farm without substantial contact with air and at substantially body temperature is accomplished in enclosed lines or pipes utilizing vacuum. The portable vacuum receiving tanks from one or more farms are then promptly transported without substantial cooling to a central processing plant where the milk therein is weighed and collected without contact with air in processing tanks. This milk in these processing tanks, which has not been substantially contacted by air nor subjected to substantial prior cooling, is then drawn therefrom, homogenized under superatmospheric pressure, rapidly heated at least to pasteurization temperatures or sterilization temperatures, and cooled and sealed in suitable containers, all of this being done without contact with air. The milk processed in this manner has substantially all of the characteristics and attributes of fresh milk and may be kept over long periods of time. In fact, when the milk is sterilized and packaged in cans it keeps substantially indefinitely without refrigeration.

As set forth in detail in said aforementioned application Ser. No. 95,225, such a process is a decided improvement over theretofore known procedures in commercially handling and processing milk wherein, during the processing thereof, the milk comes in contact with air and is cooled at intervals appreciably below body temperature prior to pasteurization. Generally speaking, milk and cream commercially processed by those theretofore known procedures, while meeting sanitation requirements, definitely are lacking in certain qualities and this is true for both pasteurized bottled milk and canned evaporated or condensed milk; their flavor and palatability are considerably less than what they could be; they have "off flavors" such as rancid, tallowy, cardboardy, cowy and cooked or pasteurized flavors; they have a leucocyte sludge that necessitates clarification steps to remove it; there is often a visible separation of cream layers after standing even when homogenized; when placed in coffee feathering usually occurs because of its low heat stability; acidity develops rapidly in the pasteurized milk and cream turning the same sour rather quickly even under refrigeration; they have a low heat stability and will tend to coagulate when exposed to high temperatures; when canned for long time preservation they have or develop extreme "off flavors"; and vitamin C concentration is quickly lost.

Generally, these deficiencies in milk and cream commercially processed by those theretofore known procedures are brought about by absorption of oxygen by the milk from the air, particularly where the milk is cooled in the presence of air; by enzymic action, such as lipolysis, instigated by cooling and warming before pasteurization or sterilization; by bacterial action due to high bacterial content; by homogenization of the milk at high temperatures following pasteurization; and by methods of pasteurization wherein the milk is exposed to high temperatures for considerable periods of time and without turbulence during the exposure.

The process, disclosed in the aforementioned applications and briefly described above and also disclosed in this application, produces a resultant milk and cream having qualities theretofore unobtainable and wherein the aforementioned deficiencies of milk and cream commercially processed by those theretofore known methods are eliminated or at least materially lessened. "Off flavors" such as rancid, tallowy, cowy and cooked or pasteurized flavors are substantially eliminated; leucocyte sludge is substantially eliminated without clarification; there is no visible separation of cream layers in homogenized milk even after long standing; there is no feathering of cream when placed in coffee; there is substantially no development of acidity over long periods of time; the milk and cream have high heat stability to prevent coagulation and high viscosity when exposed to high temperatures; the milk and cream can be successfully canned for long time preservation with or without refrigeration; and vitamin C and other vitamin concentration is maintained over long periods of time.

By maintaining the raw milk out of contact with air and not substantially below body temperature from the time it is withdrawn from the cow until it is heated at least to pasteurization temperatures, bacterial growth is substantially inhibited, absorption of oxygen and hence oxidation are substantially prevented, the butter fat globules of the milk are kept in substantially liquid form and enzymatic reaction of lipase is held to a minimum. These factors are of prime importance in the production of milk and cream having the aforementioned desirable and advantageous qualities.

It has been found that there is substantially no bacterial growth in the raw milk kept at substantially body temperature and out of contact with air for a period of three hours or so, and that the bacteria count of the milk processed in accordance with the disclosure in the aforementioned applications is considerably less than that of milk processed in accordance with commercial procedures theretofore known. Keeping the raw milk out of contact with air also prevents contamination of air-borne bacteria in addition to preventing absorption of oxygen and hence oxidation of the milk. The prevention of oxygen absorption of the raw milk, and of the milk in subsequent processing, prevents oxidation changes in the milk and its constituents that lead to lower heat stability and to the development of undesirable flavors.

Because the raw milk is maintained at substantially body temperature out of contact with air before heating at least to pasteurization temperatures, the butter fat globules remain liquid instead of becoming solid or clumped as in the aforementioned commercial procedures where the raw milk is substantially cooled prior to pasteurization. This is one of the factors that maintains the enzymatic action of lipase at a minimum to provide a milk product which may be safely stored over long periods of time, which prevents the formation of "off flavors" such as rancid and tallowy, which permits thorough heat treatment of the milk, which provides the milk with heat stability, and which permits more thorough homogenization without the formation of leucocyte sludge or sediment. Because oxidation of the milk is retarded or inhibited, the vitamin C concentration is maintained over long periods of time.

One of the principal objects of the instant invention is to provide certain improvements in the process disclosed in the aforementioned applications for more readily adapting that process to large scale commercial production and to enhance still further the characteristics of the milk products produced thereby.

In the process disclosed in the aforementioned applications and described above, the raw milk, collected without contact with air and at substantially body temperature in the portable vacuum receiving tanks, is transferred without contact with air into the processing tanks without substantial prior cooling. The milk is then drawn from these processing tanks, homogenized under super-atmospheric pressure, heat treated and packed in suitable containers. From the time that the milk is collected in the portable vacuum receiving tanks at the farms to the time that it is heat treated at the processing plant, its temperature normally gradually drops a slight amount from a body temperature of 95 degrees F. to substantially 80 to 85 degrees F., this time interval usually being within substantially three hours. During this time interval and under these conditions of absence of air and temperatures between 80 and 95 degrees F., there is substantially no increase in the bacteria count, a strong bactericidal action being present. Also, there is no substantial clumping or solidifying of the fat globules and very little enzymatic reaction of lipase.

However, when the time interval is appreciably extended there is an extremely rapid increase in the bacteria count, including growth in staphylococci aureas that might be present in the milk and therefore affording the possibility of enterotoxin. Further, longer time intervals under these conditions allows further temperature reductions resulting in greater clumping or solidifying of the fat globules and greater enzymatic reaction of lipase which greatly effect the favorable characteristics of the ultimate milk product. Thus, in the process disclosed in the aforementioned applications, it is extremely desirable, if not necessary, to maintain this time interval within substantially three hours. This means that the milk upon arrival at the central processing plant, considering the time required to transport it to the processing plant, must be substantially immediately processed and that, if there is any appreciable delay in the heat treatment thereof as by delays in handling, shutdowns, power failure or the like, the ultimate milk product would be unsatisfactory.

In accordance with one feature of the instant invention, the raw milk in the portable vacuum receiving tanks, which has not been substantially contacted by air nor subjected to substantial prior cooling, and after being transferred without contact with air into the storage tanks, is heated under vacuum in the storage tanks to between substantially 120 degrees and 140 degrees F., preferably in the range of substantially 130 degrees to 140 degrees F. The milk so stored in the storage tanks is preferably mildly agitated to prevent separation of the cream while it remains therein. The milk heated to between these temperature limits under these conditions is then withdrawn from the storage tanks, homogenized under super-atmospheric pressure, rapidly heated at least to pasteurization temperatures or to sterilization temperatures, and cooled and sealed in suitable containers, all of this being done without contact with air. The storing of the milk in the storage tanks under these conditions permits a large storage capacity in the processing plant so that the milk need not be finally processed substantially immediately upon delivery from the farms to the processing plant. The milk may be advantageously and safely stored under these conditions for long periods of time, at least 12 hours or so. The storing of the milk in the processing tanks under these conditions has no deleterious effect upon the final milk product, but, in fact, the favorable characteristics thereof.

The raw milk withdrawn from the cows and collected in the portable vacuum receiving tanks without contact with air and without substantial cooling has an extremely low gas content as compared to raw milk withdrawn and collected in the conventional manner wherein the milk is subject to contact by air. Various gas content studies of conventional commercial raw milk reveal the average volume percent of oxygen therein as substantially 0.47 with maximum values running as high as 0.59 and 0.74. The average volume percent of nitrogen in such milk is found by such studies to be substantially 1.29 and of carbon dioxide to be 4.45, the volume percent of total gas being substantially 6.21. The milk withdrawn and collected in the portable vacuum receiving tanks of this invention has substantially an average volume percent of 0.22 of oxygen, 1.05 of nitrogen, 1.49 of carbondioxide and 2.86 of total gas. When the milk is transferred without contact with air from the portable vacuum receiving tanks without substantial prior cooling into the storage tanks and heated under vacuum preferably to between substantially 130 to 135 degrees F., its gas content is still further decreased, its average volume percent being substantially 0.09 of oxygen, 0.66 of nitrogen, 0.68 of carbon dioxide and 1.45 of total gas. After this milk has been homogenized under superatmospheric pressure, rapidly heated to sterilization temperatures of approximately 280 to 285 degrees F., rapidly cooled to approximately 85 degrees F., filled in cans under vacuum and sealed, all out of contact with air, its gas content becomes still lower. The sealed sterilized milk product has an average volume percent comprising substantially 0.05 of oxygen, 0.57 of nitrogen, 0.50 of carbon dioxide and 1.13 of total gas. This extremely low gas content of the milk existing throughout the entire process of this invention, and greatly enhanced by the heating of the milk under vacuum in the processing tanks, is one of the principal contributing factors which permits sterilization and canning of the milk with substantially no oxidation thereof and with production of substantially no off flavors therein which would be caused by oxidation of the milk.

The raw milk withdrawn from the cows and collected in the portable vacuum receiving tanks without contact with air and without substantial cooling has a very low bacteria count and a strong bactericidal action takes place in the milk over periods extending up to two and one-half or three hours. Because of this bactericidal action there is no increase in the bactericidal content of the milk in the vacuum receiving tanks until two or three hours after milking. This allows a substantial time interval for transporting the milk in the portable vacuum receiving tanks from the farms to the processing tanks at the central processing plant without any substantial change in the bacterial count. This extended period of bactericidal action is due to both the vacuum under which the milk is maintained, making conditions unfavorable for the growth of aerobic bacteria, and to the initial low bacterial count of the milk. The bacteria count of the milk in the vacuum tanks shortly after milking is completed usually runs about 900 to 4000 per ml. and, as pointed out above, there is substantially no increase therein over a period of about two and one-half to three hours. Over this period there is no increase in staphylococci aureas, quite commonly found in milk, and therefore the possibility of enterotoxin, one of the causes of food poisoning, is extremely limited.

However, after this period of two and one-half to three hours, under these conditions, there is a rapid bacterial growth including rapid growth in staphylococci aureas, if any is present. In accordance with said one feature of this invention, wherein the milk within this time interval of substantially three hours is transferred without contact with air from the portable vacuum receiving tanks into the processing tanks and heated in vacuum to 120 to 140 degrees F., the bacterial growth is not only stopped, but, in fact, the bacteria count is materially reduced. Tests show that milk in portable vacuum receiving tanks having bacteria counts per ml. of 2000, 1500 and 23,000 transferred into processing tanks and held for 12 hours under 20 inches of vacuum at 135 degrees F. had their bacteria count reduced respectively to 0, 800 and 1000. The average of these three tests show a reduction in the average bacteria count from 8833 per ml. to 600 per ml., an extremely large reduction. Thus, the milk may be safely stored in the processing tanks over long periods of time, at least 12 hours, before the milk is finally processed. This permits the use of a large storage capacity at the processing plant, greatly facilitating the handling and processing of the milk and it reduces the bacterial content of the milk making more certain the ultimate sterilization thereof. All of this is in addition to maintaining the gas content of the milk at a minimum to prevent substantial oxidation thereof during processing. This holding of the low gas content of the milk under vacuum in the storage tank at these temperatures results in no heated flavor or other flavor defects that could be attributed to it and it is not deleterious to the favorable characteristics and attributes of the ultimate milk product. In fact, these favorable characteristics and attributes are enhanced.

Because the milk in the processing tanks is heated under vacuum to between substantially 120 to 140 degrees F. in the storage tanks, the liquid butter fat globules therein remain in liquid form instead of becoming solid or clumped which would take place at low temperatures. Thus, enzymatic action of lipase during long storage of the milk in the processing tanks is kept at a minimum with the result that there is no development of rancid or stale off flavors normally caused by lipolysis. Because the butter fat globules are not clumped or solidified, and because lipolysis is maintained at a minimum, formation of free fatty acids is substantially eliminated and more thorough homogenization is made possible. It is found that homogenization of the milk processed in accordance with this invention gives best results if homogenized at temperatures between 130 degrees and 170 degrees F. If the milk is homogenized at lower temperatures, there will be less efficiency in breaking up and dispersing the fat globules, and if the milk is homogenized at higher temperatures, the viscosity of the milk will be decreased. Thus, milk may be drawn directly from the heated processing tanks for homogenizing purposes within the aforementioned homogenizing temperature range or rapidly and easily preheated through a continuous closed preheater to any desired point in that range. The homogenized milk, after sterilization, cooling and canning, while having, for example, a butter fat content of three and one-half percent, has a consistency and a taste corresponding to a milk of at least four and one-half to five percent butter fat content. Homogenizer or leucocyte sludge is practically nonexistent in milk processed in accordance with this invention, this probably being due to the great stability of the protein content of the milk and the absence of chemical changes which are normally brought about by oxidation and lipolysis in conventionally processed milk.

Raw milk, which is appreciably cooled before processing, undergoes physical and chemical changes and the extent of these changes become increasingly greater as the milk is cooled below body temperature. While the method of collecting milk through the portable vacuum receiving tanks and promptly delivering it to the processing plant, as discussed above, normally keeps the temperature thereof above 80 to 85 degrees F. wherein a small degree of solidification of some of the butter fat globules and lipolysis may be brought about, without material affecting the ultimate product, it is possible that the temperature of the milk might be decreased well below those values due to delays in handling the milk and in transporting the milk under severe frigid conditions. This would result in substantial clumping or solidification of the fat globules and substantial enzymatic action of the lipase, even though the milk is maintained out of contact with air, and would result in an inferior ultimate milk product.

Another feature of this invention is to prevent a substantial decrease in the milk temperature below body temperature before the milk is transferred from the portable vacuum receiving tanks into the processing tanks wherein the milk temperature is accurately controlled. Preferably, the milk temperature is maintained in the portable vacuum receiving tanks substantially at/or above body temperature. This prevents substantial clumping or solidification of the fat globules and lipolysis, and when the milk is maintained at/or above body temperature even the small degree of solidification of the fat globules and lipolysis are eliminated, which enhances still further the favorable characteristics of the milk product. Any suitable means may be utilized for heating the milk at the farms and maintaining the milk at least at body temperature until it is transferred into the processing tanks at the processing plant. Considering heating equipment capacity usually available at farms, the cost of insulating and/or heating the portable vacuum receiving tanks and the handling of the milk in accordance with the process of this invention, I prefer to heat the milk at the farms to substantially 135 degrees F. as it is being transferred from the weigh jars into the vacuum receiving tanks. In this way the milk is not cooled below body temperature but is immediately heated to 135 degrees F. as it is being transferred into the portable vacuum receiving tanks. The large volume of milk transferred at substantially this temperature into the portable vacuum receiving tanks will not normally cool to substantially below body temperature before it is transferred into the processing tanks at the central processing plant even though it is subjected to extreme frigid atmospheric conditions or delays in handling while being transported to the processing plant. Heating the milk substantially to this temperature at the farm does not result in a heated flavor in the ultimate milk product and it may be done simply and inexpensively. Heating the milk at the farms also is effective in killing bacteria, particularly staphyloccus aureas, and results in a lower bacteria count when the milk is transferred into the processing tanks.

In rapidly heating the milk to sterilization temperatures of substantially 280 to 285 degrees F. in the continuous enclosed heater there is a tendency of the milk to "burn on" in the helical milk passage in the heater, this being due primarily to the large temperature differential between the milk and the steam for heating the same. This tendency to "burn on" is materially decreased by increasing the velocity of flow of the milk through the heater and by preheating the milk before it is sterilized, thereby decreasing the required temperature differential in the heater. Maintaining the milk at between substantially 120 to 140 degrees F. in the processing tanks is also beneficial toward this end as is preheating the milk to substantially 135 to 170 degrees F. before homogenization. Further to eliminate the tendency to "burn on" the milk may be rapidly brought up to sterilization temperatures in a plurality of stages, as by the use of separate heaters or a combination heater utilizing lower temperature steam in the first stage and higher temperature steam in the last stage, thereby maintaining the temperature differentials in the heaters at a minimum. Further to prevent the formation of heated flavor in the ultimate milk product the sterilized milk is promptly aseptically cooled to substantially 85 degrees F. in a continuous enclosed cooler before it is aseptically canned. In this way the milk is kept at high temperatures only a short period of time measured in seconds.

The sterile canned milk produced by the process of this invention, in addition to having the aforementioned favorable characteristics and attributes, has nutrient values at least as favorable as fresh pasteurized grade A milk, it being quite normal in its protein, fat, lactose and mineral content, and this is so even when the sterile canned milk is weeks and months old. Its vitamin content, including vitamins A, $B_1$, $B_2$, $B_{12}$ and C is high and there is very little loss even though stored over long periods of time. For example, one sample of the sterile canned milk still had over 75 percent of the original vitamin C content of the milk as it was drawn from the cow, some thirty days after it was processed and another sample contained approximately 50 percent some six months after processing. Another principal object of this invention is to provide a sterile canned milk having the foregoing characteristics and attributes.

Other objects and advantages of this invention will become apparent to those skilled in the art upon reference to the accompanying specification, claims and drawings, in which:

Figure 1:
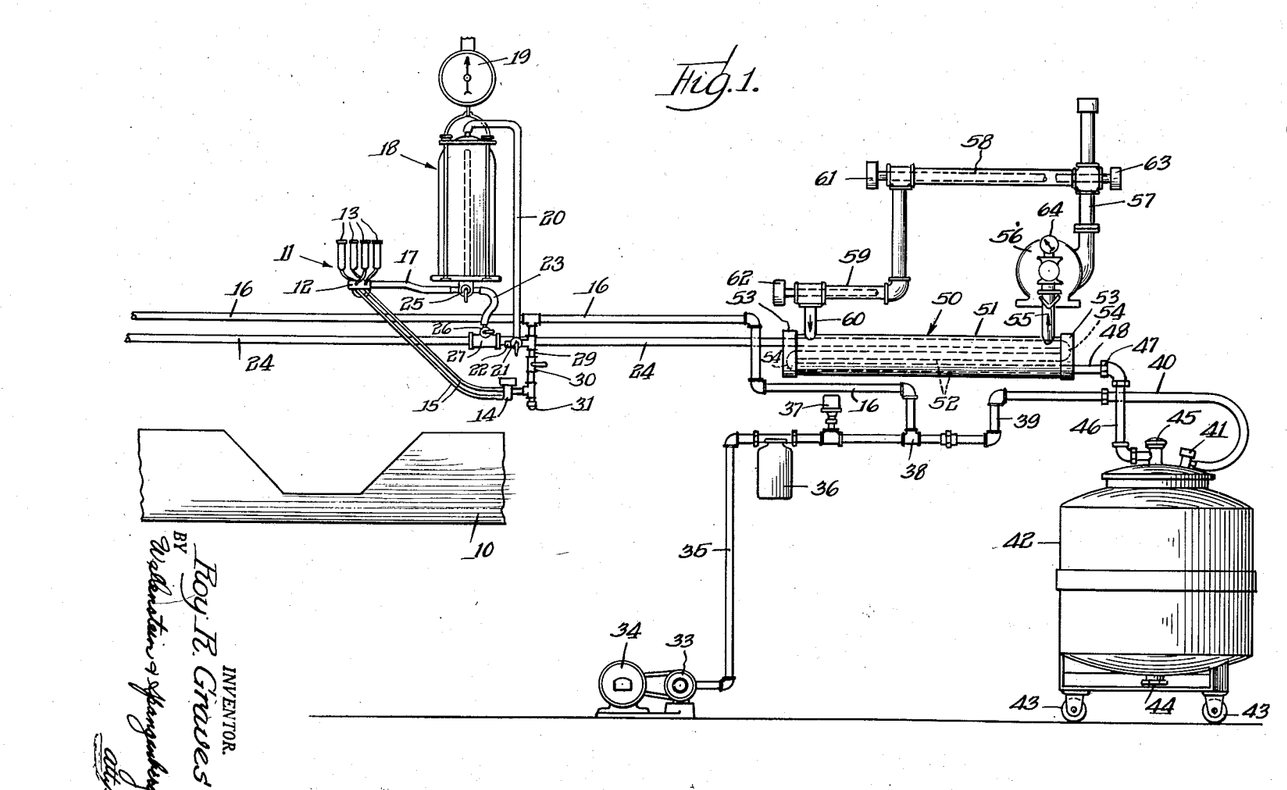
Fig. 1 is an elevational view in the form of a layout illustrating a milking and collecting apparatus located at the farms for withdrawing milk from the cows and collecting the withdrawn milk in portable vacuum receiving tanks, all without contact with air.

Referring first to Fig. 1, there is illustrated a milking and collecting apparatus located at the farms for withdrawing milk from a plurality of cows and collecting the withdrawn milk in portable vacuum receiving tanks, all without contact with air. This milking and collecting apparatus may be of the form disclosed in detail in the aforementioned copending application Ser. No. 257,211. This milking and collecting apparatus is preferably a multiple arrangement for milking a plurality of cows at a time, Fig. 1, for purposes of simplification, illustrating a single milking arrangement. Here a portion of a curb of a multiple milking parlor is designated at 10. The milking parlor may be of the form disclosed in the aforementioned copending application Ser. No. 781,602. This curb extends upwardly from the floor supporting the cows being milked and is substantially waist-high to the operator in the pit so as to facilitate handling of the milking equipment by the operator.

A vacuum pulsator milking device is generally designated at 11 and it includes a manifold 12 and a plurality of teat cups 13 connected thereto. This milking device is of standard construction having flexible liners in the teat cups which are expanded and contracted by the application of vacuum and air thereto for performing the milking operation. A magnetic pulsator 14 is connected by tubes 15 to the vacuum pulsator milking device 11 for performing the milking operation, this magnetic pulsator 14 being connected to a vacuum line 16. A magnetic pulsator is preferably utilized for each vacuum milking device 11 and is located closely adjacent thereto to maintain the vacuum and air connections therebetween as short as possible. This increases the sharpness of the pulsating action and, therefore, provides an increased milking efficiency.

During the milking of a cow the milk is withdrawn by means of vacuum from the vacuum pulsator milking device 11 through a milk connection 17 into a weigh jar generally designated at 18. This weigh jar 18 has transparent side walls so that the milk collected therein from the vacuum pulsator milking device 11 may be visually inspected. The weigh jar 18 is also supported by a scale 19 so that the milking of each cow may be weighed. Vacuum is applied to the weigh jar 18 while a cow is being milked by means of a vacuum connection 20 extending from the top of the weigh jar 18 through a three-way valve 21 to the vacuum line 16. When the three-way valve 21 is moved to one position for milking purposes vacuum from the vacuum line 16 is applied to the weigh jar 18. This vacuum operates to collect the milk from the vacuum pulsator milking device in the weigh jar. When the milking operation is completed and it is desired to withdraw the milk from the weigh jar, the vacuum in the weigh jar above the milk is broken by moving the three-way valve 21 to its other position. When this is done the weigh jar above the milk is connected to a nipple 22 on the three-way valve 21. The nipple 22 may be connected to atmosphere for bleeding in a small amount of air during the interval while milk is being withdrawn from the weigh jar. It is found that the slight amount of air so bled into the weigh jar has substantially no effect upon the characteristics of the milk in the weigh jar. In other words, substantially no oxygen is absorbed by the air contacting the relatively small top surface of the milk in the weigh jar. To eliminate any possibility of air contacting the top of the milk in the weigh jar, a source of inert gas, such as nitrogen, may be connected to the nipple 22 so that this inert gas is bled into the weigh jar during withdrawal of milk therefrom.

Milk is withdrawn from the weigh jar through a milk connection 23 into a sanitary milk line 24. A valve 25 controls the milk connections 17 and 23 to control the supply of milk into and the withdrawal of milk from the weigh jar 18. The milk connection 23 is connected into the sanitary milk line 24 through a shut-off valve 26 and a T-fitting 27 in the sanitary milk line. When the valve 25 is moved to a first position it interrupts the connection between the weigh jar 18 and the sanitary milk line 24 and establishes the connection between the vacuum pulsator milking device 11 for milking purposes. When the valve 25 is moved to an intermediate position the connection between the weight jar 18 and the sanitary milk line 24 is interrupted, the connection between the weigh jar 18 and the vacuum pulsator milking device 11 is interrupted, and the vacuum pulsator milking device 11 is vented to atmosphere to facilitate removal of the same from the cow. In this position the milk is retained in the weigh jar for inspection purposes. When the valve 25 is moved to the other extreme position the connection between the weigh jar 18 and the sanitary milk line 24 is established for the purpose of withdrawing milk from the weigh jar 18 into the sanitary milk line. While Fig. 1 illustrates a single arrangement, including a vacuum pulsator milking device, a weigh jar and a vacuum pulsator connected to the vacuum line 16 and the sanitary milk line 24, of course, the apparatus may include a plurality of such arrangements arranged in parallel. Milk sampling apparatuses may be located in the milk connections between the weigh jars and the sanitary milk line for sampling the milk withdrawn from the weigh jars without contact with air, as disclosed in copending application Ser. No. 279,387, filed March 29, 1952 (now abandoned).

Instead of making the vacuum connections to the weigh jar 18 and to the magnetic pulsator 14 directly to the vacuum line 16, these connections are preferably made through a branch 29. Here each branch 29, which may be a depending branch, is associated with each weigh jar 18 and magnetic pulsator 14 and is connected into the vacuum line 16 by a T-fitting. The three-way valve 21 controlling the vacuum connection 20 is connected into the branch 29 by a T-fitting. The magnetic pulsator 14 is also connected into the branch 29 by a T-fitting and a shut-off valve 30 is located between the T-fittings for the vacuum pulsator 14 and the three-way valve 21, this shut-off valve 30 to make and break communication between the magnetic pulsator 14 and the vacuum line 16. The branch 29 also terminates in a ball check valve 31 so that any moisture in the vacuum system will drain therethrough and will not collect in the magnetic pulsator 14, which is one of the causes of sticking of the magnetic pulsator.

The milking and collecting apparatus of this invention also includes a vacuum pump 33 which may be driven by an electric motor 34, this vacuum pump 33 being connected through a pipe 35, a vacuum trap 36, a vacuum relief valve 37 and a T-fitting 38 to the vacuum line 16 for the purpose of creating a vacuum therein. The vacuum pump 33 is also connected through these devices and line 39 and a removable connection 40 to a valve 41 of a portable vacuum receiving tank 42 for creating a vacuum therein. This portable receiving tank 42 may be of any desired construction and may take the form of the portable vacuum receiving tank disclosed in my aforementioned copending application Ser. No. 95,225 or in copending application Ser. No. 279,386, filed March 29, 1952 (now Patent No. 2,751,123). The vacuum receiving tank 42 may be supported by wheels or casters 43 and may be provided with a drain connection 44. The vacuum receiving tank 42 is also provided with a milk inlet valve 45 which in turn is connected by a removable connection 46 to a breakable connection 47 on an extension 48 of the sanitary milk line 24.

The vacuum receiving tank 42 is normally cleaned and sterilized at the central processing plant and shipped to the farmer. When the milking operation by the farmer is started, the vacuum receiving tank 42 is connected to the vacuum pump 33 and to the extension 48 of the sanitary milk line 24 and then the vacuum pump 33 is started. This produces vacuum conditions in the sanitary milk line 24, as well as in the vacuum receiving tank 42 and the vacuum line 16. The valves 30 in the branches 29 are opened to operate the magnetic pulsators 14 and, hence, the vacuum pulsator milking devices 11. The three-way valves 21 in the vacuum connections 20 to the weigh jars are manipulated to produce vacuum in the weigh jars and the valves 25 are manipulated to establish the milk connection between the vacuum pulsator milking devices and the weigh jars. In this way the cows are milked and the milk from the cows collected in the weigh jars. After each cow is milked and the milk inspected and weighed in the weigh jars 18 the milk is transferred from the weigh jars into the portable vacuum receiving tank 42, this being accomplished by manipulation of the valves 25 and the three-way valves 21. After the complete herd is milked, the valves 30 in the branches are closed to shut off the magnetic pulsators 14 and the vacuum pulsator milking device 11. The valves 41 and 45 on the portable vacuum receiving tank 42 are closed to seal the milk therein under vacuum and then the connections to the valves 41 and 45 are removed. The milk is then transported at substantially body temperature under vacuum in the vacuum receiving tank 42 to the central processing plant. The vacuum utilized at the farm and, hence, the vacuum produced in the portable vacuum receiving tanks 42 is preferably in the range of 10 to 15 inches. This milking and collecting apparatus, illustrated in Fig. 1, may be readily and simply cleaned by circulating a suitable cleaning fluid therethrough, as is disclosed in more detail in said copending application Ser. No. 257,211.

The milk so withdrawn from the cows and collected under vacuum in the portable vacuum receiving tanks 42 is substantially at body temperature of 95 degrees F. Under normal handling and ambient temperature conditions the milk, when delivered to the central processing plant, will not have decreased substantially in temperature, it usually being above substantially 80 to 85 degrees F. It is possible, however, that the temperature of the milk might be decreased well below those values due to delays in handling the milk and in transporting the milk under severe frigid conditions. It is preferable to guard against this possibility and to prevent, under these unusual conditions, the temperature of the milk from decreasing substantially below body temperature. Preferably, the milk temperature is maintained in the portable vacuum receiving tanks substantially at/or above body temperature. Any suitable means may be utilized for heating the milk at the farms and maintaining the milk at least at body temperature until it is transferred into the processing tanks at the processing plant. Considering heating equipment capacity usually available at farms, the large cost of insulating and/or heating the portable vacuum receiving tanks and the handling of the milk in accordance with the process of this invention, I prefer to heat the milk at the farms to substantially 135 degrees F. as it is being transferred from the weigh jars 18 into the portable vacuum receiving tanks 42. The large volume of milk transferred at substantially this temperature into the portable vacuum receiving tanks will not normally cool to substantially below body temperature before it is ransferred into the processing tanks at the central processing plant, even though it is subjected to extreme frigid atmospheric conditions or delays in handling while being transported to the processing plant.

Fig. 1 illustrates a simple means for so heating the milk at the farms. It includes a heat exchanger, generally designated at 50, having an outer shell 51 and a plurality of inner pipes 52 secured in place therein. It also includes a hinged head 53 at each end which are provided with cavities 54 interconnecting the ends of the pipes 52. The milk line 24 is connected into one of the heads and the milk line extension 48 is connected into the other head. Milk passing from the milk line 24 to the milk line extension 48 courses the pipes 52 in series. The heads 53 are hinged to be opened for simply and readily cleaning the interior of the pipes 52. Hot water is circulated about the pipes 52 in the outer shell 51 for heating the milk as it passes through the pipes 52. Hot water is circulated through the heat exchanger 50 by a closed circulating system, including a pipe 55 connected to one end of the shell 51, a pump 56, a pump discharge 57, horizontal pipes 58 and 59 and a pipe 60 connected into the other end of the shell. The pump discharge 57 may be provided with an extension for keeping the system full and for compensating for expansion and contraction. Immersion type electric heaters 61 and 62 are located in the horizontal pipe sections 58 and 59 for heating the water passing therethrough. The heated water enters the heat exchanger through the pipe 60, heats the milk and is withdrawn therefrom through the pipe 55 by the pump 56. The electric heaters 61 and 62 may be controlled by a suitable thermostatic control 63 and a thermometer 64 may be utilized for indicating the temperature of the water being circulated.

The heat exchanger unit is so arranged that the water temperature is kept at substantially 150 degrees F. for raising the milk temperature from substantially body temperature of 95 degrees F. to substantially 135 degrees F. Thus, each batch of milk which is withdrawn from the weigh jars 18 is immediately heated to substantially 135 degrees F. as it is being transferred into the portable vacuum receiving tanks 42. Heating the milk substantially to this temperature at the farm does not result in a heated flavor in the ultimate milk product and it is also effective in killing bacteria, particularly staphylococci aureas, and results in a lower bacteria count when the milk is transferred into the processing tanks in the manner hereinafter set forth. Since the milk is maintained at/or above body temperature, there is no clumping or solidification of the fat globules and lipase is substantially held inactive until finally eliminated by sterilization temperatures.

Figure 2:
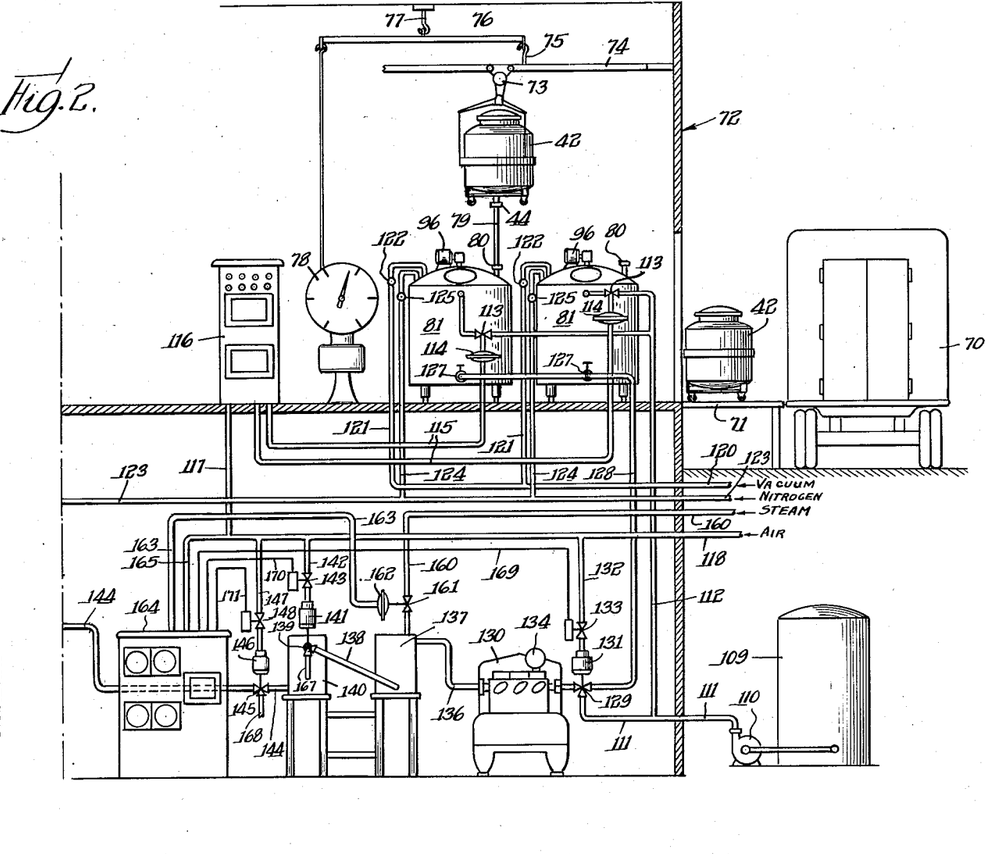
Figs. 2 and 3, when taken together, are an elevational view in the form of a layout illustrating one form of the processing equipment at the processing plant wherein the milk is withdrawn from the portable vacuum receiving tanks into processing tanks, is heated under vacuum in the processing tanks, is homogenized under superatmospheric pressure, is rapidly heated to sterilization temperatures, is rapidly aseptically cooled and is sealed in suitable containers, such as cans, all without contact with air.
Figure 3:
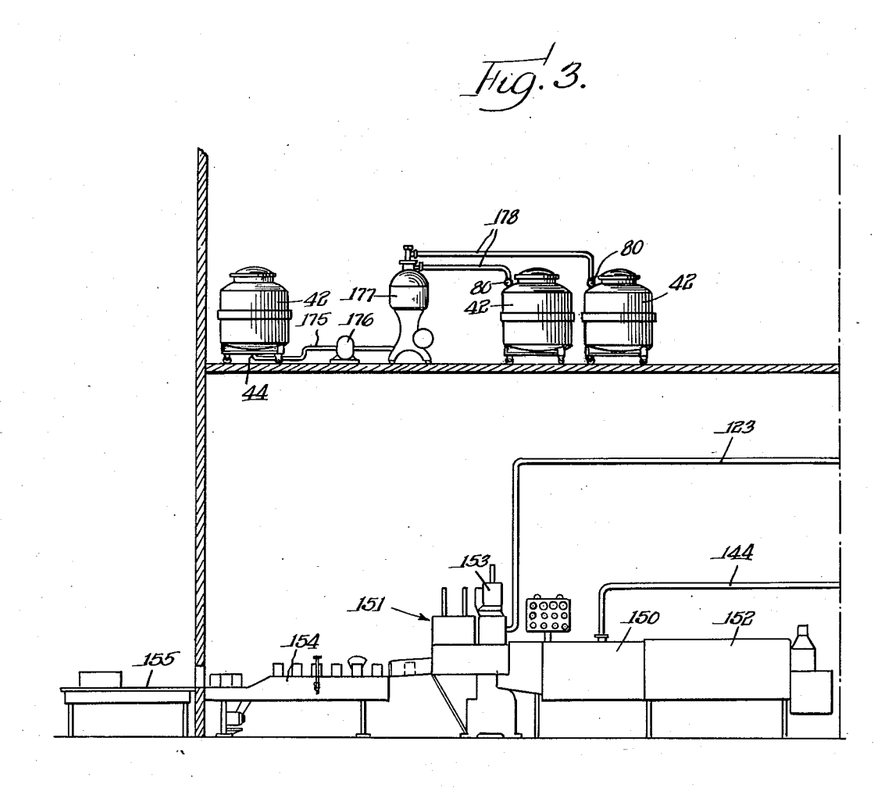

As illustrated in Figs. 2 and 3, the milk collected at the farms in the portable vacuum receiving tanks 42 may be transferred by trucks, as indicated at 70, and received on a suitable loading platform 71 of the central processing plant generally designated at 72. The filled portable vacuum receiving tanks 42 are then hoisted by a suitable hoist 73 carried by a track 74, a portion of which is carried at 75 by one end of a beam 76 pivotally mounted at 77. The other end of the beam 76 operates a scale 78 through a suitable linkage for weighing the milk in the respective portable vacuum receiving tanks 42. The milk is withdrawn from the elevated portable vacuum tanks 42 through a suitable hose connection 79 extending between the outlet 44 of the vacuum receiving tank 42 and a valve 80 communicating with a processing tank 81. Any number of processing tanks 81 may be utilized for receiving the milk from the portable vacuum receiving tanks 42, two being shown here for purposes of illustration. The vacuum in the processing tanks 81 is preferably 20 to 25 inches, which is considerably higher than the vacuum in the portable vacuum receiving tanks 42 so that when the portable vacuum receiving tanks are connected to the processing tanks the milk may be readily drained therefrom. If desired, an inert gas, such as nitrogen, may be applied to the portable vacuum receiving tanks to hasten withdrawal of milk therefrom into the processing tanks.

Figures 4, 5, 6:
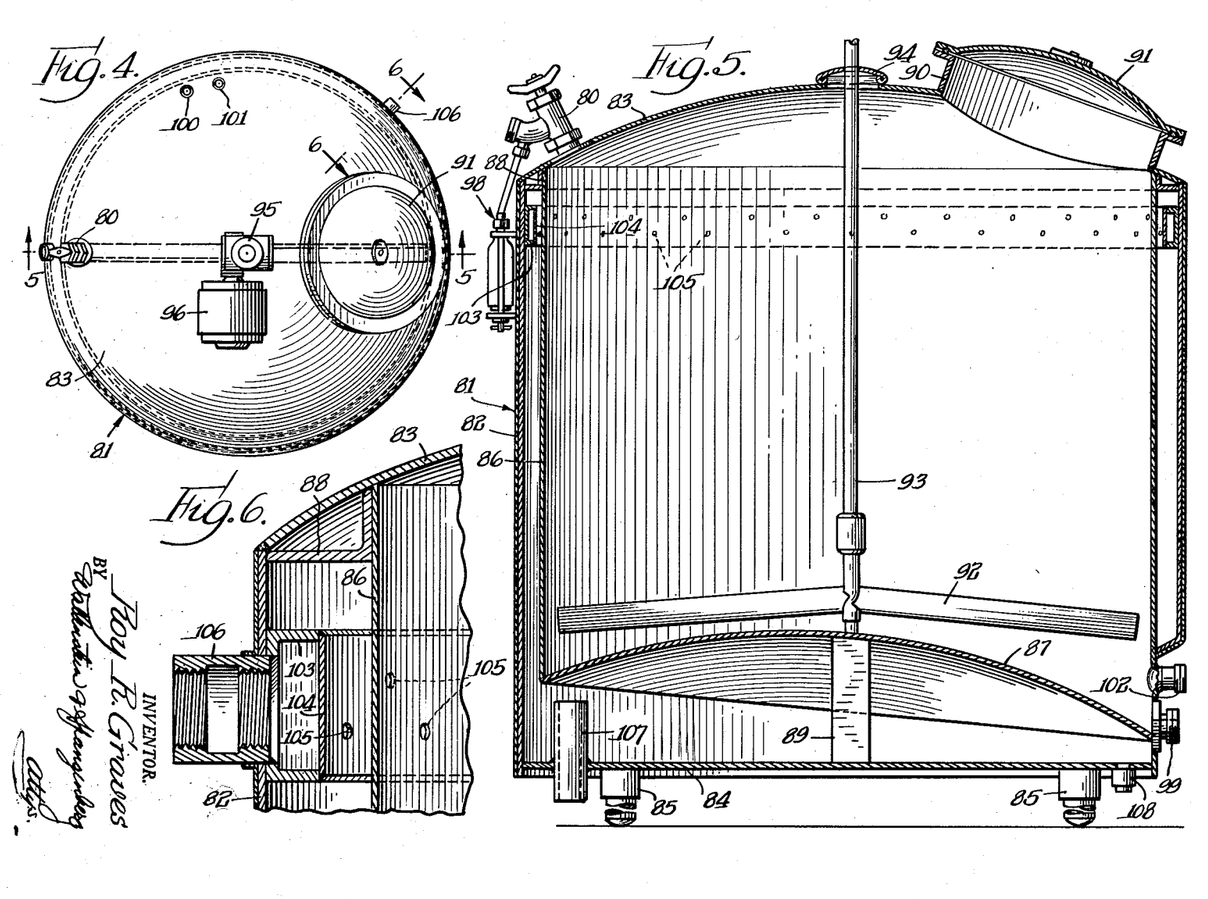
Fig. 4 is a top plan view of one of the processing tanks illustrated in Fig. 2.
Fig 5 is a vertical sectional view taken substantially along the line 5—5 of Fig. 4.
Fig. 6 is an enlarged partial sectional view taken substantially along the line 6—6 of Fig. 4.

The construction of the processing tanks is illustrated in more detail in Figs. 4 to 6. Here the processing tank, generally designated at 81, includes a reinforced outer shell 82 having a top wall 83 and a bottom wall 84, which in turn is provided with legs 85 for supporting the processing tank. The processing tank also includes an inner shell 86 having a bottom wall 87. The upper end of the inner shell 86 is reinforced by an angle member 88 and suitably welded to the top wall 83 of the processing tank. The bottom wall 87 of the inner shell 86 is preferably centrally supported by a post 89. This bottom wall 87 is preferably convex in configuration and tilts toward the discharge point of the inner shell 86. The top wall 83 of the processing tank is provided with a manhole 90 to which is detachably secured and sealed a manhole cover 91. This manhole and manhole cover permit access to the interior of the processing tank for readily scrubbing and cleaning the same.

Rotatably mounted within the inner shell 86 is an agitator 92 driven by a shaft 93 which extends out through the top wall 83 through a sutiable seal ring 94. The shaft 93 is rotated through a gear reducer 95 by an electric motor 96. The interior of the processing tank is completely sealed so that a relatively high degree of vacuum may be established therein. Milk drawn from the portable vacuum receiving tanks 42 through the valve 80 is received within the inner shell 86 and is mildly agitated by the agitator 92 to prevent cream separation. As milk is drawn into the processing tank 81 it may be sampled by a milk sampling device connected to the valve 80 and generally designated at 98. This milk sample device may take the form disclosed in copending application Serial No. 279,387, filed March 29, 1952. Milk may be withdrawn from the processing tank through an outlet port 99. The top wall 83 of the processing tank may be provided with a pair of fittings 100 and 101, to which are secured vacuum and nitrogen lines, respectively. Vacuum, preferably in the range of 20 to 25 inches, is applied within the processing tank while milk is being drawn therein and while milk is being stored therein. When milk is being withdrawn from the processing tank through the milk outlet 99, the vacuum in the tank is broken by supplying nitrogen into the processing tank. The vacuum and nitrogen may be controlled by suitable valves. The valve 80 regulates the supply of milk into the tank and a valve associated with the outlet port 99 regulates the withdrawal of milk from the tank. The processing tank may also be provided with one or more fittings 102 adjacent the bottom thereof for receiving a thermometer bulb for measuring the temperature of the milk within the processing tank and for receiving a suitable measuring device for measuring the level of the milk within the processing tank.

Adjacent the top of the processing tank and between the outer and inner shells 82 and 86 is a ring formed of a channel member 103 and a plate 104 welded thereto, the channel member being suitably welded to the outer shell 82. The plate 104 is provided with a plurality of holes 102 for cascading hot water over the outer surface of the inner shell 86 for the purpose of heating the milk. This hot water is supplied to the ring through a fitting 106 communicating with the same. The hot water supplied to the ring and cascading over the inner shell 86 is preferably at a temperature of substantially 150 degrees F. for raising the temperature of the milk to substantially 120 to 140 degrees F. and for maintaining the milk at these temperatures. Large volumes of hot water may be utilized for this purpose and the milk may be maintained at these temperatures with a relatively small temperature differential. In this way overheating of the milk, with a possible heated flavor in the ultimate product, is entirely eliminated. The agitator 92 also assists in maintaining the milk at the desired temperatures with this small temperature differential between the hot water temperature and the milk temperature. The amount of heat applied to the milk in this manner may be regulated by controlling the flow of hot water. Water may be drained from between the outer and inner shells 82 and 86 through a suitable outlet pipe 107 located in the bottom wall 84. To drain completely the outer shell 82, a drain outlet 108 may also be provided in the bottom wall 84.

Referring again to Figs. 2 and 3, hot water may be supplied from a suitable source of hot water, indicated at 109, by means of a circulating pump 110 and pipes 111 and 112. The flow of hot water to the processing tanks 81 is controlled by valves 113 located in the pipes 112 which are operated by suitable air operated motors 114. These air motors 114 are connected by air pipes 115 to a suitable recording and control apparatus 116 which is supplied with air through pipes 117 and 118 leading from a source of air under pressure, not shown. The re- recorder and controller 116 may be controlled by thermometer bulbs extending into the processing tanks through the fittings 102. In this way the temperature of the milk in the processing tanks 81 may be accurately controlled to within the desired temperature range of 120 to 140 degrees F., preferably within substantially 130 to 135 degrees F.

A source of vacuum at substantially 20 to 25 inches, not shown, may be connected to the processing tanks 81 through pipes 120 and 121 under the control of valves 122, these vacuum pipes 121 being connected to the fittings 100 in the processing tanks 81. A source of nitrogen under pressure may be connected to the processing tanks 81 through pipes 123 and 124, the pipes being connected to the fittings 101 in the processing tanks and being controlled by valves 125 located in the pipes 124. The valves 122 and 125 are manipulated for the purpose of drawing milk into the processing tanks, for maintaining the milk therein under vacuum and for withdrawing milk from the processing tanks.

The outlet ports 99 of the processing tanks are connected through valves 127 to a milk line 128, which in turn communicates through a three-way valve 129 with the inlet side of a homogenizer 130. This homogenizer 130 may be of conventional construction for homogenizing the milk under superatmospheric pressures. Such a homogenizer is adjustable for adjusting the homogenizing pressure and it is found that excellent results are obtained when a homogenizing pressure of substantially 2000 pounds per square inch is utilized. This pressure thoroughly homogenizes the milk and provides adequate pressure for forcing the milk rapidly through the heaters and coolers located downstream therefrom. The homogenizer may be provided with a suitable pressure indicator 134 for indicating the homogenizing pressure, the homogenized milk being delivered into a pipe 136. The homogenizer 130, therefore, operates to withdraw the milk from the processing tanks 81 without contact with air, homogenize the same and deliver the homogenized milk to the pipe 136. The three-way valve 129 is also connected to the hot water pipe 111 and is controlled by an air motor 131 receiving air through pipes 132 and 118. The air pipe 132 includes a solenoid valve 133 for turning on and off the air to the air motor 131 for positioning the three-way valve 129. The three-way valve 129 is normally in the position to supply milk from the pipe 128 to the homogenizer 130 but, under certain conditions, is moved to another position for shutting off the milk supply and supplying hot water from the pipe 111 to the homogenizer 130, as is more fully pointed out hereinafter.

The homogenized milk is delivered under pressure through the pipe 136 to the inlet end of a heater 137 wherein the milk is heated to sterilization temperatures, preferably to substantially 280 to 285 degrees F. The sterilized homogenized milk passes from the heater 137 through a holding tube 138 and a three-way valve 139 into the inlet side of a cooler 140 where the milk is rapidly cooled to substantially 90 degrees F. The milk is discharged from the cooler 140 through a pipe 144. The three-way valve 139 between the holding tube 138 and the cooler 140 is operated by an air motor 141 receiving air under pressure from air pipes 142 and 118. A solenoid valve 143 in the air pipe 142 turns on and off the air supply to the air motor 141. Normally, the three-way valve 139 is positioned to pass milk from the holding tube 138 into the cooler 140, but under certain conditions, as hereinafter pointed out, the solenoid valve 143 is operated to connect the holding tube 138 to a drain pipe 167 and to disconnect the holding tube 138 from the cooler 140.

The heater and cooler 137, 140 preferably take the form of the heater and cooler disclosed in my copending application Ser. No. 223,483, filed on April 28, 1951 (now Patent No. 2,706,620). The heater 137 includes a nested outer casing and inner core, the inner core being provided with a helical groove to provide a helical milk passage between the casing and the core through which the milk is forced by the homogenizer. The casing and core receive high pressure steam for the purpose of heating the milk in the helical passage to sterilization temperatures as the milk flows through the passage with great speed and turbulence. The cooler 140 is of a similar construction, having a nested outer casing and inner core provided with a helical milk passage therebetween. In the cooler a cooling medium such as cold water, preferably at a temperature of about 50 to 60 degrees, is circulated through the casing and core for cooling the milk being forced through the helical passage by the homogenizer with great speed and turbulence. The cores of the heater and the cooler are removable from the casings so that the helical passages may be readily scrubbed and cleaned. High pressure steam from a source of steam, not shown, is supplied through a pipe 160 to the casing and the core of the heater 137 under the control of a valve 161 operated by an air motor 162. For purposes of simplicity, the exhaust of steam from the heater 137 and the supply and discharge of cooling water to the cooler 140 are not here illustrated, for these may be conventional and are shown in the aforementioned copending application Ser. No. 223,483.

The milk line 133 leading from the cooler 140 is provided with a three-way valve 145 operated by an air motor 146 which receives air under pressure from pipes 147 and 118. Located in the air pipe 147 is a solenoid valve 148 for turning on and off the air to the air motor 146. Normally, the three-way valve 145 is positioned to pass cooled milk from the cooler 140 through the milk line 144. Under certain conditions, to be pointed out hereinafter, the solenoid valve 148 operates the air motor 146 and hence the three-way valve 145 to connect the cooler 140 with a drain pipe 168. The milk line 144 extends to a filling mechanism 150 of an aseptic canning machine, generally designated at 151. The aseptic canning machine also includes a sterilizing portion 152 for sterilizing cans and lids before they are fed to the filling portion 150. The cooled sterile milk is fed from the milk line 144 into the sterilized cans in the filling portion 150 and this is preferably done under vacuum produced by the presence of superheated steam in the filling portion and also in a sealing portion 153. The filled cans are then advanced to the sealing portion 153 of the canning machine, wherein the sterile milk is sealed in the cans under vacuum in the presence of the superheated steam. Preferably the degree of vacuum in the sealing portion is regulated by the admission of nitrogen or other inert gas supplied, for example, by the nitrogen pipe 123. The aseptically filled and sealed cans then are fed along an inspection station 154 where the cans are inspected and weighed. Thereafter the filled cans are fed to a packaging platform 155 where they are packaged in suitable cartons for shipment.

The withdrawal of the milk from the processing tanks, the homogenization thereof under superatmospheric pressures, the rapid heating thereof to sterilization temperatures, the rapid aseptic cooling thereof and the aseptic filling and sealing of the milk in cans is all accomplished without contact with air.

The air motor 162 for operating the steam valve 161 for controlling the supply of steam to the heater 137 is controlled through an air pipe 163 by a recording and control apparatus 164 which receives air under pressure through pipes 165 and 118. This control apparatus 164 responds to the temperature of the milk in the holding tube 138 and operates to position the steam valve 161 to maintain the temperature of the milk in the holding tube 138 substantially constant, preferably between the sterilization temperatures of substantially 280 to 285 degrees F. It takes the milk substantially eight seconds to pass through the holding tube 138 so that the milk is maintained at least at substantially 280 to 285 degrees F. for eight seconds for completely sterilizing the same. The solenoids of the solenoid valves 133, 143 and 148 are electrically connected by conductors 169, 170 and 171, respectively, to the recording and control apparatus 164 to be controlled thereby. The control apparatus 164, in addition to responding to the temperature of the milk in the holding tube 138, also responds to the pressure in the homogenizer 130 as indicated by the pressure gauge 135. If the milk temperature in the holding tube 138 falls below sterilization temperatures, the control apparatus 164 operates the solenoid valves 133 and 143 for in turn operating the air motors 131 and 141 to position the three-way valves 129 and 139 to shut off the supply of milk from the processing tanks 81 and the supply of milk to the cooler 140 and to circulate hot water from the hot water pipe 111 through the homogenizer 130, pipe 13, heater 137, holding tube 138 and drain pipe 167. This hot water circulated through the heater 137 removes the milk from the heater to prevent burning of the milk in the heater and flushes the same with clear hot water. This operation prevents milk which has not been completely sterilized from passing through the cooler to the canning machine. When sterilization temperatures are restored in the holding tube 138, the solenoids of the solenoid valves 133 and 143 may be operated by suitable push buttons, not shown, for operating the air motors 131 and 141 to restore the three-way valves 129 and 139 to their normal positions. In so doing, the three-way valve 129 is first operated to shut off the supply of hot water and to turn on the supply of milk and then the three-way valve 139 is next operated after water has been expelled from the system and milk appears at the three-way valve 139.

If the supply of milk to the homogenizer should become exhausted, this will result in a decrease in homogenizer pressure, whereupon the control apparatus 164 operates the solenoid valves 133 and 148, which in turn operate the air motors 131 and 146 to move the three-way valves 129 and 145. This shuts off the milk line 128 to the homogenizer and the milk line 144 to the canning machine and provides for circulation of hot water from the hot water pipe 111 through the homogenizer pipe 136, heater 137, holding tube 138, cooler 140, pipe 144 and drain pipe 168. This circulation of hot water removes milk from the heater and cooler and flushes the same to prevent "burning on" of milk in the heater. When the milk supply is restored and after this portion of the system through which the hot water has been circulated is cleaned and sterilized, the solenoid valves 133 and 148 may be actuated by suitable push buttons, not shown, to again circulate milk in the normal fashion.

The milk transferred into the processing tanks 81 may be standarized for butter fat content, milk of high butter fat content and milk of low butter fat content (cream and skim milk) being transferred into the processing tanks for standardizing purposes. As shown in Fig. 3, the milk in some of the portable vacuum receiving tanks 42 is separated to provide milk of high butter fat content and milk of low butter fat content. Here milk is drawn from one or more portable vacuum receiving tanks 42 through a pipe 175 by a pump 176 and delivered to a separator 177. The separator discharges milk through pipes 178 into other portable vacuum receiving tanks 42, one of such tanks receiving milk of high butter fat content while the other receiving milk of low butter fat content. This milk of different butter fat content is selectively transferred into the processing tanks 81 for standardizing the butter fat content therein. All of this separation and standardization is also carried on without contact with air and without substantially cooling.

Figure 7:
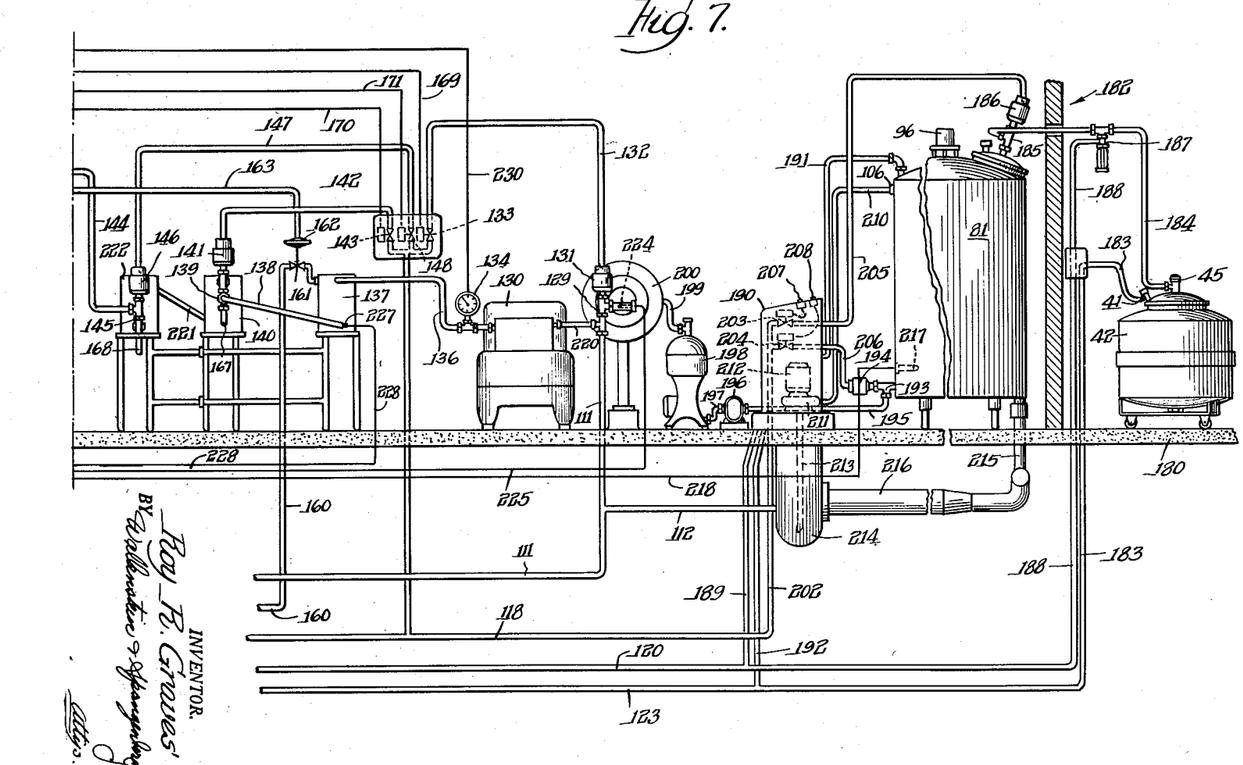
Figs. 7 and 8, when taken together, are in elevational view in the form of a layout, illustrating another form of the processing equipment at the processing plant.
Figures 8, 9:
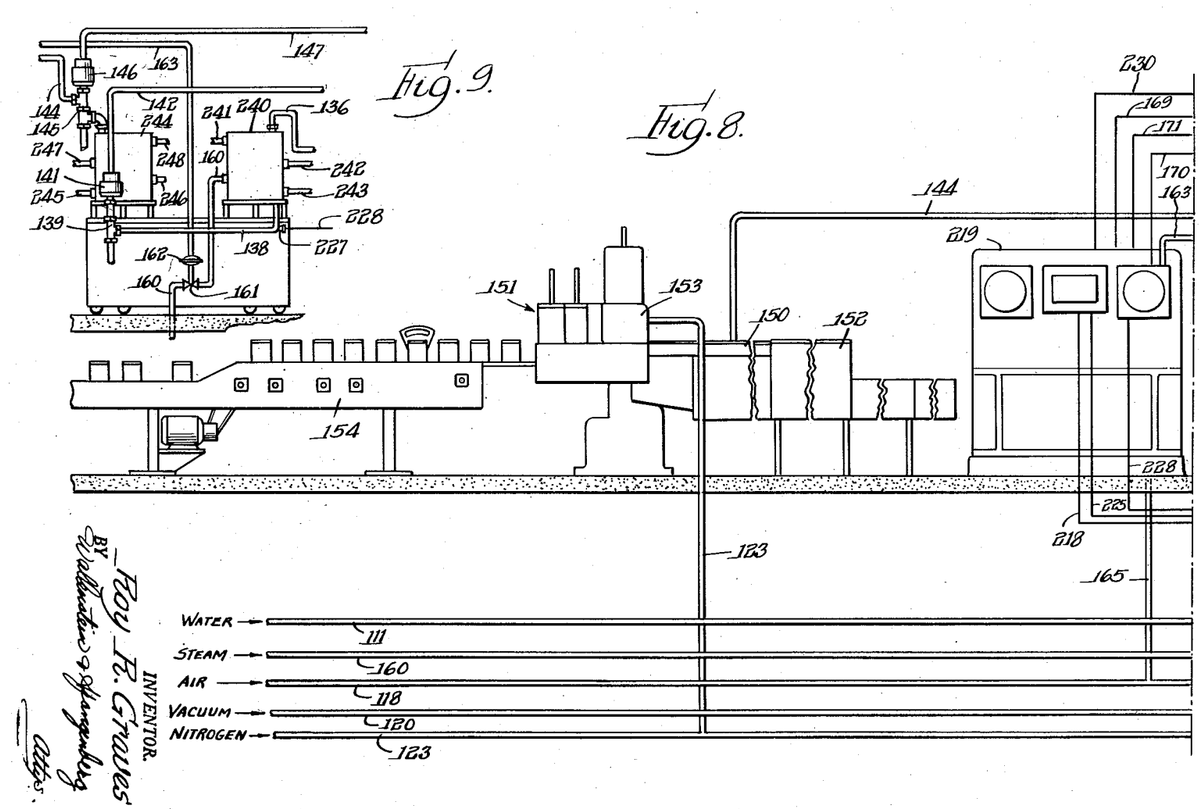
Fig. 9 is an elevational view in the form of a layout illustrating an additional form of heater and cooler which may be utilized in the apparatus illustrated in Fig. 7.

The form of the processing apparatus illustrated in Figs. 7 and 8 is very much like that illustrated in Figs. 2 and 3, like reference characters being utilized for like parts. It differs somewhat in constructional details, in the use of a preheater and in the use of multiple stage cooling. Here the portable vacuum receiving tanks 42 are received on the receiving platform 180 of a central processing plant generally designated at 182. A nitrogen pipe 183 communicating with a pipe 123 leading to the source of nitrogen, not shown, is connected through valve 41 to the portable vacuum tank 42 and a milk line 184 connected to a valve 185 on the processing tank 81 is connected to the valve 45 of the portable vacuum receiving tank 42. The valve 185 is controlled by an air motor 186 and when the valves 185, 45 and 41 are opened, milk is transferred without contact with air from the portable vacuum receiving tank 42 into the processing tank 81 by reason of the high degree of vacuum existing within the processing tank. The milk in the portable vacuum receiving tank before it is transferred into the processing tank is weighed and as it is being transferred into the processing tank it may be sampled by means of the sampling device 187, which may correspond to the sampling device disclosed in copending application Serial No. 279,387, filed March 29, 1951. Preferably, the sampling device 187 is connected through pipes 188 and 120 to the source of vacuum, not shown, to insure an aliquot sample. Vacuum is applied to the processing tank 81 from the source of vacuum, not shown, through pipes 120, 189, a valve, not shown, in a control unit 190, and pipe 191 connected to the processing tank 81. The vacuum is applied during the transfer of milk from the portable vacuum receiving tanks into the processing tank and also during the storage of milk in the processing tank. When milk is to be withdrawn from the processing tank 81 for processing purposes, nitrogen from a source of nitrogne, not shown, is supplied to the processing tank through nitrogen pipes 123 and 192, a valve, not shown, in the control unit 190, and pipe 191 connected to the processing tank. Milk is withdrawn for processing purposes from the processing tank 81 through a valve 193 operated by an air motor 194, the valve 193 being connected through a pipe 195, a pump 196 and a pipe 197 to a standardizing clarifier 198. Milk clarified and standardized as to butter fat content flows from the standardizing clarifier 198 through pipe 199 into a preheater 200. Of course, the milk in the processing tank 81 must have a butter fat content higher than the desired standard. The excess cream separated by the standardizing clarifier may be collected without contact with air in suitable tanks and, if desired, may be returned to the processing tanks to maintain the butter fat content in the processing tanks above the desired standard. The air motors 186 and 194 for operating, respectively, the inlet valve 185 to the processing tank 81 and the outlet valve 193 from the processing tank 81, receive their air pressure from a source of air under pressure, not shown, through air lines 118 and 202, solenoid valves 203 and 204 in the control unit 190 and pipes 205 and 206. The solenoid valves 203 and 204 are controlled by push buttons 207 and 208. Thus, by merely manipulating the push buttons 207 and 208 the valves 185 and 193 are operated to control the supply of milk to, and withdrawal of milk from, the processing tank 81.

Hot water is supplied to the processing tank 81 for heating the milk therein by means of a pipe 210 connecting the fitting 106 of the processing tank to the discharge side of a circulating pump 211 operated by an electric motor 212, the pump and the motor being located in the control unit 190. The tail pipe 213 of the pump 211 extends into a sump 214 containing hot water at the desired temperature. The heated water collected in the bottom of the processing tank 81 flows through a pipe 215 into a tube heat exchanger 216, which in turn communicates with the sump 214, thereby providing a closed system for the hot water for heating the milk in the processing tank 81. Low pressure steam is applied to the tube heat exchanger 216 for heating the water and the supply of such low pressure steam is regulated to maintain the water at the desired temperature, preferably about 150 degrees F. Make-up water is supplied to the closed system from a source of water through pipes 111 and 112. A thermometer bulb 217, located within the processing tank 81, responds to the temperature of the milk in the processing tank and is connected, as indicated at 218, to a recording and control apparatus 219. This recording and control apparatus 219 controls the supply of low pressure steam to the heat exchanger 216 for heating the water to a value for maintaining the temperature of the milk in the processing tank 81 at a desired value between substantially 120 and 140 degrees F. While a single processing tank 81 has been disclosed for purposes of illustration, of course, any desired number of such processing tanks may be utilized.

The clarified and standardized milk is heated in the preheater 200 by means of low pressure steam and is delivered through three-way valve 129 and pipe 220 to the homogenizer 130, where the milk is homogenized under superatmospheric pressure, preferably about 2000 pounds per square inch. A thermometer bulb 224, responding to the temperature of the milk leaving the preheater 200, is connected, as indicated at 225, to the recording and control apparatus 219, which in turn controls the supply of low pressure steam to the preheater 200 for the purpose of heating the milk to a predetermined value within a temperature range between 135 degrees F. and 170 degrees F. Thus the milk is heated to within this temperature range for homogenization purposes, such homogenizing being obtained when the milk is within this temperature range.

The homogenized milk is forced under pressure through milk line 136, heater 137, holding tube 138, three-way valve 139, cooler 140, milk line 221, second stage cooler 22, three-way valve 145 and milk line 144 to the filling mechanism 150 of the canning machine 151. The milk is heated to sterilization temperatures in the heater 137, preferably to a value between 280 and 285 degrees F., and is held at this temperature for substantially eight seconds in the holding tube 138. The milk is then cooled to substantially 90 degrees in the cooler 140 and substantially 75 degrees in the second stage cooler 222. A thermocouple 227 responds to the temperature of the milk in the holding tube 138 and is connected, as indicated at 228, to the recording and control apparatus 219. Likewise, the pressure gauge 134, responding to the homogenizer pressure, is connected, as indicated at 230, to the recording and control apparatus 219. The steam valve 161, for controlling the supply of high pressure steam to the heater 137, and the three-way valves 129, 139 and 145, for controlling the circulation of milk and hot water through the heaters and coolers, are controlled by the recording and control apparatus 219 in response to the temperature of the milk in the holding tube 138 and to the homogenizer pressure, in the same manner as described above in connection with Figs. 2 and 3. The canning machine is the same as that illustrated in Fig. 3 and it operates in the same manner.

Thus, in the arrangement illustrated in Figs. 7 and 8, the milk from the farms is transferred into the processing tanks 81 wherein it is heated to a value between substantially 120 and 140 degrees F. It is then standardized and clarified and preheated to within substantially 135 and 170 degrees F. and homogenized under superatmospheric pressure at this temperature. The milk then is rapidly heated to sterilization temperatures between substantially 280 to 285 degrees F. and then rapidly, aseptically cooled in stages to substantially 90 degrees and 75 degrees F. The milk is then supplied to the canning machine wherein the milk is aseptically filled and sealed in cans. The preheating of the milk produces best homogenization results and also decreases the temperature differential required to rapidly heat the milk in the heater 137 to sterilization temperatures. This preheating of the milk also adds to the capacity of the heater and decreases the heating load of the heater which allows better control of the sterilization of the milk and which allows more rapid circulation of the milk through the heater. Narrow temperature differentials and rapid circulation of the milk through the heater greatly decreases the tendency of the milk to "burn on" in the heater.

Fig. 9 illustrates a modified heater and cooler arrangement which may be substituted for the heater and cooler arrangement illustrated in Fig. 7 to provide further multistage heating of the milk to sterilization temperatures and to provide multistage cooling of the sterilized milk. Here the heater 240 includes an outer casing and an inner core having a helical groove on its outer surface. This helical groove on the inner core forms an enclosed helical passage through which the milk is forced at great speed and with great turbulence by the homogenizer. The milk is first heated by low pressure steam which is circulated through the upper portion of the heater, the low pressure steam being admitted at 241 and discharged at 242. The milk is heated by high pressure steam in the lower portion of the heater 240, high pressure steam being admitted through the steam pipe 160 under the control of the steam valve 161 and being discharged through the outlet 243. Thus, in the heat exchanger 240 the milk is first heated by low pressure steam and then heated to sterilization temperatures by the high pressure steam. In this way the temperature differentials between the milk and the steam for heating the same are maintained at a minimum and further operates to decrease the tendency of the milk to "burn on" in the heat exchanger.

The cooler 244 is also a two stage cooler and is of similar construction to the heater. It includes an outer casing and an inner core having a helical milk passage therebetween through which milk is circulated with great velocity and turbulence by the homogenizer. The cooler is divided into two cooling sections, a lower first stage cooling section and an upper second stage cooling section. Cooling water is admitted to the first stage cooling section through pipe 245 and is discharged therefrom through pipe 246. Cooling water is admitted to the second stage cooling section through pipe 247 and discharged through pipe 248. Thus, as the milk is circulated through the cooler 244 it is cooled in two stages.

Considerable experimental work has been, and is being, done by various investigators in connection with canned sterilized milk, including evaporated and condensed milk and also powdered milk, in an attempt to determine why such milk products, particularly when stored without refrigeration, exhibit "off flavors and odors," have poor heat stability, have separation of fat and protein, and are subject to gelation, these experiments being made principally with market milk which is subject to contact with air and which has been cooled prior to processing. The general consensus of opinion of these investigators is that these defects are connected in some way with oxidation of the fat and with enzymatic action, including lipolysis. However, no satisfactory solution to these difficulties have been forthcoming from these investigators.

Lipolysis may proceed in milk from the time it is drawn from the cow and it may be spontaneous or it may be induced by changes in temperature or by agitation. Such lipase action, and perhaps other enzymatic action, bring about important physical and chemical changes in this complex solution called milk. Some of these changes are readily discerned by flavor and odor changes. The many physical and chemical changes may change the surface tension of the milk, may change the shape of the protein molecules from a spherical to a linear type, and may cause increases in the number of polar groups resulting in increases in hydration, etc. These and many other changes may be the causes of the lack of stability found by many investigators in fluid milks and creams that are canned and expected to retain edible qualities for human consumption for many months, but that undergo such changes as protein and fat separation, gelation, and develop undesirable odors and flavors. Some investigators have found that commercial milk that is deaerated before it undergoes heat treatment for the manufacture of milk powder has better keeping qualities than commercial milk which is not deaerated before being heated. These things explain in some degree why the milk produced by the process disclosed in this application possesses characteristics not heretofore known in the dairy industry. They explain why milk processed in accordance with this invention is maintained so nearly like it was at the time it was first drawn from the cow's udder, until the time of processing and packaging, does not undergo those qualities after many months of storage, does not undergo the chemical and physical changes commonly found in other sterile milk products, and that makes it possible to produce sterile milk products of exceptional quality that retain these good qualities after many months of storage.

The average gas content of anaerobically drawn milk of five investigators, as shown by Noll and Supplee in an article in the Journal of Dairy Science, volume 24, No. 12, December, 1941, is set forth in the following Table 1:

TABLE 1

| Oxygen, Vol. Percent | Nitrogen, Vol. Percent | Carbon Dioxide, Vol. Percent | Total Gas, Vol. Percent |
| --- | --- | --- | --- |
| 0.12 to 0.16 | 1.08 to 1.19 | 4.81 to 5.51 | 6.08 to 6.75 |

Noll and Supplee also show the gas content of 63 samples of mixed herd milk at a commercial milk plant in New York State, as set forth in the following Table 2:

TABLE 2

| | Oxygen | Nitrogen | Carbon Dioxide | Total Gas |
| --- | --- | --- | --- | --- |
| Minimum | 0.30 | 1.18 | 3.44 | 4.92 |
| Maximum | 0.59 | 1.63 | 6.28 | 8.50 |
| Average | 0.47 | 1.29 | 4.45 | 6.21 |

Noll and Supplee also reproduce the following data by Sharp and by Frayer on the gas content of milk during the holding process of pasteurization (144 degrees F.):

TABLE 3

| | Reported by Sharp | Reported by Frayer | | |
| --- | --- | --- | --- | --- |
| Origin of Samples | Oxygen, Vol. Percent | Oxygen, Vol. Percent | Nitrogen, Vol. Percent | Carbon Dioxide, Vol. Percent |
| Before heating | 0.77 | 0.557 | 1.287 | 3.944 |
| Beginning of holding period [1] | 0.39 | 0.493 | 1.156 | 3.944 |
| End of holding period [1] | 0.32 | 0.395 | 1.075 | 3.814 |
| Bottom of external cooler (40–47° F.) | 0.55 | 0.522 | 1.019 | 2.337 |

[1] Pasteurizing.

This Table 3 shows that the milk lost oxygen content as it was heated and tended to regain it as it was exposed to air at lower temperatures. This is in accordance with the physical principles governing the solubility of a gas in a liquid, that at constant pressure the solubility of a gas in a liquid is inversely proportional to the temperature.

The following Table 4 sets forth the average gas content of the milk being treated by the process disclosed herein showing the gas content of the raw milk in the portable vacuum receiving tanks as they arrive at the processing plant under substantially 10 to 12 inches vacuum and at a temperature of substantially 85 degrees F., showing the gas content of the milk in the processing tank under substantially 20 inches of vacuum and at substantially 130 degrees F., and showing the gas content of the sterilized milk in the cans a few days after canning, the milk being sealed in the cans under substantially 12 to 14 inches vacuum:

TABLE 4

| Origin of Samples | Samples, average | Oxygen, Vol. Percent | Nitrogen, Vol. Percent | Carbon Dioxide, Vol. Percent | Total Gas, Vol. Percent |
| --- | --- | --- | --- | --- | --- |
| Raw milk from vacuum farm tanks | 9 | 0.22 | 1.05 | 1.49 | 2.86 |
| Milk from processing tanks after being heated to approx. 130° F | 4 | 0.09 | 0.66 | 0.68 | 1.45 |
| From sealed cans of processed milk few days after canning | 5 | 0.05 | 0.57 | 0.50 | 1.13 |

The gas content tabulation of Table 1 is the result of laboratory experimental work where every effort was made to exclude air while the milk was drawn, while the tabulation in Table 4 is from milk commercially produced by the process disclosed in this application and is illustrative of the results secured from day to day in the use of this process. The tabulations given in Tables 2 and 3 are also those secured from milk produced under commercial conditions by the practices in common use.

A comparison of these tables shows that the oxygen content of the milk drawn and collected from the cows by the process disclosed herein (Table 4) is slightly higher than that of the milk drawn under pure aerobic conditions (Table 1), but is less than half the oxygen content of the milk drawn by present-day commercial processes, as shown in Tables 2 and 3. While the oxygen content of the bottled milk, as shown in Tables 2 and 3, has returned to the level of the raw milk prior to processing, the oxygen content of the milk produced under the process disclosed herein continues to decline during the process and reaches the low point in the finished milk in the can. This extremely small oxygen content in the milk produced in accordance with the process herein disclosed is one of the important factors which makes it possible to obtain the highly desirable characteristics and attributes in the finished milk product.

There are various ways of removing oxygen from milk, such as deaeration by vacuum and by flushing with nitrogen, carbon dioxide or other inert gases. While a certain proportion of the oxygen can be removed by such means, once the oxygen is absorbed it is impossible to get rid of all of it by the means mentioned. Such practices, by the very nature of the equipment required to carry them out, must be put into practice in the plant where the milk is processed, which means that a certain amount of chemical changes may have taken place in the milk by oxidation processes between the time when the milk is drawn from the cow and the time when it is deaerated and processed. Thus it appears that the process of this application, which excludes oxidation from the time the milk is drawn from the cow, is one of the important reasons for its greater stability and capacity to remain unchanged during storage.

This lack of change in the chemical constitution in milk produced by this process is illustrated most forcibly by its vitamin C content. It is a well established fact that the conservation of vitamin C in milk is dependent on the absence of dissolved oxygen and that the amount of vitamin C in milk a few hours after it is drawn and processed, is almost in inverse proportion to the amount of dissolved oxygen present. Yet in the low oxygen content milk of this invention analysis shows a vitamin C content of 15.8 mg./qt. when more than thirty days have elapsed from the time of production and processing. This is at least 75 percent of the amount of vitamin C in milk as drawn from the cow. Most grade A market milk produced in the conventional manner has lost all of its vitamin C content within 72 hours following processing.

The nitrogen content of the raw milk of this invention (Table 4) does not depart so much from the levels shown in raw milk, in Tables 1 to 3, but the nitrogen content of the finished milk product of this invention is considerably lower than that of the finished product shown in Table 3.

The carbon dioxide content of the milk of this invention (Table 4) shows the greatest departure from the data in Tables 1 to 3 of any of the three gases. The carbon dioxide content is extremely low in the raw milk and in the finished product. Investigation has shown that the presence of oxygen and carbon dioxide is necessary for the production of, or greatly increases the yields of, both the alpha and beta types of toxin. Thus these toxins cannot be produced or greatly increased in yield in the milk of this invention, with its low oxygen and carbon dioxide content, even though staphylococci aureus were present in sufficient numbers to produce the toxin. In this connection, the fact should not be overlooked that the carbon dioxide content of milk has experimentally been brought to low levels by flushing with air, oxygen and nitrogen over long periods of time after the milk has reached the laboratory. Even so, this would not affect the possibility of toxins having been developed before the flushing at the laboratory or plant, even if flushing should prove to be feasible commercially.

While one of the principal reasons in not cooling the milk before processing is the prevention of lipolysis, a second important reason is that there is less likely to be an absorption of oxygen at the higher temperatures maintained. Hence, the noncooling of the milk between the time of drawing the same from the cow and processing it is very helpful in keeping a very low oxygen content in the milk at all times under commercial conditions, as is shown in Table 4.

In accordance with the process of this invention, the milk is homogenized under superatmospheric pressures before it is subjected to sterilization and there are a number of reasons why this is done. There is some danger of forcing air into the milk during homogenization due to faulty packing around the plungers. If the homogenizer were on the sterile side, such air leaks would also cause bacterial contamination of the sterile milk. Also, the milk, if homogenized following cooling in the cooler, would be at a lower temperature and, therefore, more likely to absorb oxygen if it were subjected to air leaks than is the case at the much higher temperatures prevailing at homogenization prior to sterilization. Homogenization has a tendency to break up and disperse clumps of bacteria as well as clumps of butter fat globules. Homogenization before sterilization therefore results in more killing of these dispersed bacteria than if they were permitted to pass through the heater in clumps. Then too, the homogenizer itself is often the source of some bacterial contamination of the milk. Such bacterial contamination of milk already sterilized, as might be the case if homogenization followed sterilization, would result in heavy losses since canned milk must be completely sterile in order to keep for an indefinite period. High temperature homogenization (150 to 190 degrees F. and above) reduces the viscosity of milk, but is more efficient in breaking up clumps of fat globules and preventing cream separation, while low temperature homogenization (110 to 130 degrees F. and lower) gives a greater viscosity to the milk but has less efficiency in breaking up and dispersing the fat globules. By homogenizing at an intermediate temperature range between substantially 130 degrees and 170 degrees F., best homogenizing results are obtained, and also a satisfactory efficiency and minimum reduction in viscosity. Homogenization within this temperature range is obtained by homogenizing prior to sterilization. The homogenizer, located at this point in the process, also provides means for forcing the milk under high pressure through the heater and cooler with great velocity and with great turbulence. Due to the substantial absence of chemical changes which are normally brought about by oxidation and lipolysis and due to the greater stability of the protein content of the milk processed in accordance with this invention, there is substantially no homogenizer or leucocyte sludge.

It is believed, and experiments bear this out, that the development of stale flavors in milk is a manifestation of a degree of lipase action, one that did not progress to the point indicated by rancidity. Lipolysis may be spontaneous or it may be induced by changes in the temperature of the milk or by severe agitation. Lipolysis takes place more rapidly when the butter fat globules become solid or clumped, which is brought about by cooling the raw milk. The amount of solidification of the butter fat globules and, hence, the degree of lipolysis increases as the milk temperature is decreased. Since, in the process of this invention, the milk is not substantially cooled before it is sterilized, there is a minimum of solidification of the butter fat globules and, hence, a minimum lipase action. When the milk is transferred into the processing tanks and raised to within substantially 120 and 140 degrees F., the lipase action is substantially prevented with the result that stale flavors in the ultimate milk product are substantially eliminated. By raising the temperature of the milk at the farms above body temperature and preferably to substantially 135 degrees F., clumping or solidification of the fat globules and, hence, lipase action are substantially completely eliminated from the time that the milk is drawn from the cows until it is heated to sterilization temperatures.

My discovery that milk produced by the methods disclosed herein, with its low gas content and absence of oxidative and enzymatic changes, can be held for indefinite periods of time at temperatures ranging between substantially 120 and 140 degrees F. without deleterious effects to its flavor or physical characteristics and with very significant lowering of its bacterial content, has far reaching effects on control and plant practices. This beneficial effect of storing milk at these medium high temperatures rather than at low temperatures also makes it unnecessary to utilize refrigeration equipment in addition to heating equipment, thus reducing considerably operating costs. It also makes possible adequate storage capacity in the central processing plants to permit immediate transfer of milk arriving from the farms into the processing tanks for storage at these medium high temperatures where the milk may be maintained for considerable periods of time until being sterilized and canned. While the milk is being held in the processing tanks between substantially 120 and 140 degrees F., the bacteria count is continually being decreased, such decrease being illustrated in the following Table 5:

TABLE 5

|  | Milk as drawn from farm tank bacteria per cc. | Milk held 12 hrs. under 20 inches vacuum at 135° F. |
| --- | --- | --- |
| Experiment #1 | 2,000 | None |
| Experiment #2 | 1,500 | 800 |
| Experiment #3 | 23,000 | 1,000 |
| Average of 3 | 8,833 | 600 |

Milk so stored in the processing tanks produces no heated flavor or other flavor defects that can be attributed to such storage.

The heating of the milk to substantially 135 degrees F. at the farm and the storing of the milk in the processing tanks at temperatures between substantially 120 and 140 degrees F., all under vacuum, insures the milk against the development of stale, rancid and tallowy flavors, even after long periods of storage. In addition, it eliminates all probability of the formation of toxins in the milk that could have resulted from a heavy growth of staphylococcus aureus organisms in the milk had there been an undue delay in getting the milk from the farm and before it was subjected to sterilization temperatures.

The following Table 6 gives the analysis of milk processed and canned in accordance with the process of this invention on milk some thirty days after processing. Table 6 also gives the average composition of fresh milk, pasteurized, for the different constituents for comparison to the analysis of the milk processed in accordance with this invention. The sources of this latter analyses are given in footnotes. Of course, the composition of the milk will vary from the averages shown for comparison in Table 6. Milk varies in composition according to the stage of lactation of the cows, the breed of cows, the season of the year and other factors. The average composition of milk that is shown for comparison is a mean of many samples, including the extremes and the products of the variants mentioned. The agreement of the composition of the milk processed in accordance with this invention to the averages, for most of the items, is quite close.

the milk and because its presence is important in association with other food factors in disease resistance and proper metabolism. It may work in conjunction with vitamin $B_{12}$ in correcting anemia and perhaps other diseases in children.

The striking thing concerning these analyses of the sterile canned milk of this invention is its normalcy as compared to fresh pasteurized milk, even though several weeks or several months have elapsed between the time of production and processing and the time when the sample analyzed was taken. Thus the sterile canned milk of this invention is maintained at very nearly the same nutritive level that it possessed when processed without the addition of preservatives or other additives.

In addition to producing canned sterile milk comparing favorably with fresh pasteurized milk, and which may be stored substantially indefinitely without refrigeration, other milk products may be produced by the process of this invention including, for example, chocolate milk, ice cream mix, egg-nog, fruit flavored milk drinks and the like. Here the various ingredients for producing

TABLE 6

*Analysis of canned sterilized milk with comparison analysis grade A pasteurized*

|  | Canned Sterilized Milk [1] | Fresh Pasteurized Milk [2] | Cow's Milk |
|---|---|---|---|
| 1. Protein (percent N×6.38). | 3.24% | 3.2% | 3.13 to 3.77%.[6] |
| 2. Fat | 3.50% | 3.9% | 3.65 to 3.45%.[6] |
| 3. Lactose | 4.80% | 5.1% | 4.50 to 4.86%.[6] |
| 4. Total Solids | 12.33% | 12.10% (for 3.5% Milk) | |
| 5. Ash | 0.73% | 0.9% | 0.72.[6] |
| 6. Sodium | 0.049% (463.5 mg./qt.) | 0.07% | |
| 7. Potassium | 0.147% (1,390.6 mg./qt.) | 0.175% | |
| 8. Manganese | Less 0.1 mg./qt. | Less 0.1 mg./qt.[5] | |
| 9. Calcium | (1,130 mg./qt.) | 1,057 mg./qt.[5] | |
| 10. Phosphorus | (883 mg./qt.) | 900 mg./qt.[5] | |
| 11. Vitamin A | 1,567 U. S. P. units 1 qt. | 418.3 to 4806 I. U./qt.[5] | |
| 12. Vitamin $B_1$ | 0.407 mg./qt. | 0.187 to 0.302 mg./qt.[5] | |
| 13. Vitamin $B_2$ | 1.82 mg./qt. | 1.17 to 1.56 mg./qt.[5] | |
| 14. Vitamin $B_{12}$ | 3.84 micrograms 1 qt. | | |
| 15. Vitamin C | 15.8 mg./qt. 13.4 mg./qt.[3] 9.56 mg./qt.[4] 6.2 to 16.9 mg./qt.[5] | | |

[1] These are analyses of canned sterilized milk some 30 days after processing, by the Wisconsin Alumni Research Foundation.
[2] Averages of fresh pasteurized milk from "market milk and related products" by Hugo H. Sommer.
[3] Analysis of canned sterilized milk two weeks after processing, made by Biological Testing Laboratories.
[4] Analysis of canned sterilized milk six months after processing, made by Biological Testing Laboratories.
[5] Average analyses given in "The Canned Food Reference Manual, 1949."
[6] Average analyses given of cow's milk given in "Fundamentals of Dairy Science" Rogers, et al.

The canned sterilized milk of this invention is quite normal in its protein, fat, lactose and mineral content. The analysis of the vitamin content is very interesting since many of the vitamins are subject to destruction by heat, light, the ration of the sows and/or oxidation. The cans of sterile milk from which samples were taken for analysis were winter produced milk, which may account for the vitamin A content not being much higher than shown in Table 6. The thiamine and riboflavin content is well over the maximum of the range given for these vitamins in the "Canned Food Reference Manual." Since vitamin C is so readily destroyed by exposure to light and by oxidation, and for these reasons disappears so rapidly in fresh grade A milk (18.7 percent of the original vitamin C content of milk being lost at the time of pasteurization, 40.6 percent being destroyed in 24 hours, 66.8 percent being destroyed in 72 hours, and 100 percent being destroyed in 96 hours), it is interesting to note that the sterile canned milk of this invention still had over 75 percent of the original vitamin C content of the milk as it was drawn from the cow some thirty days after it was processed. Another sample of sterile canned milk of this invention contained approximately 50 percent of the vitamin C contained some six months after processing. While milk is not the most important source of vitamin C in the diet of the average person, it is important that it be present in milk in substantial quantities because of its effect on the flavor of these milk products may be introduced in desired proportions in the processing tanks and mixed with the raw milk therein. Thereafter the mixture is homogenized, sterilized, aseptically cooled and aseptically canned, all in the absence of air. These resulting milk products may be stored substantially indefinitely without refrigeration.

I claim as my invention:

1. The process of producing a canned sterilized milk product, having flavor and odor characteristics comparable to fresh milk and long time keeping characteristics without refrigeration, comprising, initially treating fresh milk to decrease the oxygen content thereof by subjecting the same to partial vacuum and elevated temperatures to provide an initially treated milk having substantially the same percentage of total solids as the fresh milk and an oxygen content of substantially 0.09 volume percent, and then homogenizing, sterilizing and canning the initially treated milk, all without substantial contact with air, which further reduces the oxygen content in the sterilized canned milk to substantially 0.05 volume percent.

2. The process of producing a canned sterilized milk product, having flavor and odor characteristics comparable to fresh milk and long time keeping characteristics without refrigeration, comprising, initially treating fresh milk to decrease the oxygen content thereof by heating the same to between substantially 120° and 140° F. in a partial vacuum of substantially 20 inches of mercury to provide an initially treated milk having substantially the same percentage of total solids as the fresh milk and an oxygen content of substantially 0.09 volume percent, and then homogenizing, sterilizing and canning the initially treated milk without substantial contact with air, which further reduces the oxygen content in the sterilized canned milk to substantially 0.05 volume percent.

3. The process of producing a canned sterilized milk product, having flavor and odor characteristics comparable to fresh milk and long time keeping characteristics without refrigeration, comprising, initially treating fresh milk to decrease the oxygen content thereof by subjecting the same to partial vacuum and elevated temperatures to provide an initially treated milk having substantially the same percentage of total solids as the fresh milk and an oxygen content of substantially 0.09 volume percent, and then homogenizing, rapidly sterilizing under high temperature-short time sterilizing conditions and rapidly cooling and canning aseptically the initially treated milk, all without substantial contact with air, which further reduces the oxygen content in the sterilized canned milk to substantially 0.05 volume percent.

4. The process of producing a canned sterilized milk product, having flavor and odor characteristics comparable to fresh milk and long time keeping characteristics without refrigeration, comprising, initially treating fresh milk to decrease the oxygen content thereof by heating the same to between substantially 120° and 140° F. in a partial vacuum of substantially 20 inches of mercury to provide an initially treated milk having substantially the same percentage of total solids as the fresh milk and an oxygen content of substantially 0.09 volume percent, and then homogenizing, rapidly sterilizing under high temperature-short time sterilizing conditions and rapidly cooling and canning aseptically the initially treated milk, all without substantial contact with air, which further reduces the oxygen content in the sterilized canned milk to substantially 0.05 volume percent.

5. The process of producing a canned sterilized milk product, having flavor and odor characteristics comparable to fresh milk and long time keeping characteristics without refrigeration, from fresh milk which has not been substantially contacted by air nor subjected to substantial prior cooling, comprising initially treating the fresh milk to decrease the oxygen content thereof by subjecting the same to partial vacuum and elevated temperatures to provide an initially treated milk having substantially the same percentage of total solids as the fresh milk and an oxygen content of substantially 0.09 volume percent, and then homogenizing, sterilizing and canning the initially treated milk, all without substantial contact with air, which further reduces the oxygen content in the sterilized canned milk to substantially 0.05 volume percent.

References Cited in the file of this patent

UNITED STATES PATENTS

| | | |
|---|---|---|
| 1,798,413 | Graves | Mar. 31, 1931 |
| 1,825,645 | Martin | Sept. 29, 1931 |
| 1,883,420 | Stephens | Oct. 18, 1932 |
| 1,977,511 | Graves | Oct. 16, 1934 |

OTHER REFERENCES

Abstract No. 150, Journal of Dairy Science, vol. 35, No. 3 of March 1952, page A23.